US009177363B1

(12) United States Patent  
Huang et al.

(10) Patent No.: US 9,177,363 B1  
(45) Date of Patent: Nov. 3, 2015

(54) METHOD AND IMAGE PROCESSING APPARATUS FOR IMAGE VISIBILITY RESTORATION

(71) Applicant: National Taipei University of Technology, Taipei (TW)

(72) Inventors: Shih-Chia Huang, Taipei (TW); Bo-Hao Chen, Taipei (TW); Wei-Jheng Wang, Taipei (TW)

(73) Assignee: National Taipei University of Technology, Taipei (TW)

( * ) Notice: Subject to any disclaimer, the term of this patent is extended or adjusted under 35 U.S.C. 154(b) by 0 days.

(21) Appl. No.: 14/474,317

(22) Filed: Sep. 2, 2014

(51) Int. Cl.
*G06K 9/40* (2006.01)
*G06T 5/00* (2006.01)
*G06T 11/00* (2006.01)
*G06T 5/10* (2006.01)

(52) U.S. Cl.
CPC . *G06T 5/001* (2013.01); *G06T 5/10* (2013.01); *G06T 11/001* (2013.01); *G06T 2207/10004* (2013.01); *G06T 2207/10024* (2013.01); *G06T 2207/20032* (2013.01)

(58) Field of Classification Search
None
See application file for complete search history.

(56) References Cited

U.S. PATENT DOCUMENTS

| 8,249,303 | B2* | 8/2012 | Nitanda | G06T 5/002 382/104 |
| 8,755,628 | B2* | 6/2014 | Fang et al. | G06T 5/009 382/274 |
| 2008/0317287 | A1* | 12/2008 | Haseyama | B60R 1/00 382/103 |
| 2010/0040300 | A1* | 2/2010 | Kang et al. | G06K 9/00664 382/255 |
| 2010/0067823 | A1* | 3/2010 | Kopf et al. | G06K 9/00624 382/274 |
| 2011/0188775 | A1* | 8/2011 | Sun et al. | G06K 9/40 382/274 |
| 2014/0072216 | A1* | 3/2014 | Fang et al. | G06T 5/009 382/167 |
| 2014/0140619 | A1* | 5/2014 | Mukhopadhyay et al. | G06T 5/40 382/167 |
| 2014/0198993 | A1* | 7/2014 | Tan | G06T 5/003 382/275 |
| 2014/0205192 | A1* | 7/2014 | Wang | G06T 5/00 382/167 |

OTHER PUBLICATIONS

Xingyong Lv, Wenbin Chen, I-fan Shen, "Real-Time Dehazing for Image and Video," Pacific Conference on Computer Graphics and Applications, pp. 62-69, 2010 18th Pacific Conference on Computer Graphics and Applications, 2010.*

Kang et al , "Fast Single Image Dehazing Using Iterative Bilateral Filter", Information Engineering and Computer Science (ICIECS), 2010.*

(Continued)

*Primary Examiner* — Andrae S Allison
(74) *Attorney, Agent, or Firm* — Jianq Chyun IP Office

(57) ABSTRACT

A method and image processing apparatus for image visibility restoration are provided. The method includes the following steps: receiving an input hazy image including input pixels; obtaining edge information of each of the input pixels according to a median filtering operation and a dark channel; determining a transmission map according to each of the input pixels and atmospheric light associated with the input hazy image in each color channel; obtaining a refined transmission map according to the edge information and the transmission map; adjusting the refined transmission map by performing a gamma correction operation thereon to obtain an enhanced transmission map; determining a color difference value corresponding to each of the color channels; recovering scene radiance for each of the input pixels in each of the color channels according to the corresponding color difference value, the enhanced transmission map, and the atmospheric light to produce and output a de-hazed image.

18 Claims, 3 Drawing Sheets

(56) References Cited

OTHER PUBLICATIONS

K. He, J. J Sun and X. Tang "Single Image Haze Removal Using Dark Channel Prior", Proc. IEEE Conf. Computer Vision and Pattern Recognition.*

Wenbo Jin; Zengyuan Mi; Xiaotian Wu; Yue Huang; Xinghao Ding, "Single image de-haze based on a new dark channel estimation method," Computer Science and Automation Engineering (CSAE), 2012 IEEE International Conference on , vol. 2, no., pp. 791,795, May 25-27, 2012.*

Kim, J.-H et al "Single Image Dehazing Based on Contrast Enhancement," IEEE Conference on Acoustics, Speech and Signal Processing, 2011, pp. 1273-1276.*

KokKeong Tan, et al., "Enhancement of Color Images in Poor Visibility Conditions," Image Processing, 2000. Proceedings. 2000 International Conference on, vol. 2, Sep. 10-13, 2000, pp. 788-pp. 791.

Srinivasa G. Narasimhan, et al., "Interactive (De)Weathering of an Image using Physical Models," IEEE, IEEE Workshop on Color and Photometric Methods in Computer Vision, In Conjunction with ICCV, Oct. 2003, pp. 1-pp. 8.

Johannes Kopf, et al., "Deep Photo: Model-Based Photograph Enhancement and Viewing," ACM Transactions on Graphics (TOG)—Proceedings of ACM SIGGRAPH Asia 2008 TOG Homepage, vol. 27, Issue 5, Dec. 2008, Article No. 116.

Yoav Y., et al., "Polarization-based vision through haze," Applied Optics, Jan. 20, 2003, vol. 42, No. 3, pp. 511-pp. 525.

Srinivasa G. Narasimhan, et al., "Contrast Restoration of Weather Degraded Images," IEEE Transactions on Pattern Analysis and Machine Intelligence, vol. 25, No. 6, Jun. 2003, pp. 713-pp. 724.

Shree K. Nayar, et al., "Vision in Bad Weather," Proceeding ICCV '99 Proceedings of the International Conference on Computer Vision, vol. 2, Sep. 20, 1999, pp. 820-pp. 827.

Srinivasa G. Narasimhan, et al., "Removing Weather Effects from Monochrome Images," Computer Vision and Pattern Recognition, 2001. CVPR 2001. Proceedings of the 2001 IEEE Computer Society Conference on, vol. 2, 2001, pp. 186-pp. 193.

Robby T. Tan, "Visibility in Bad Weather from a Single Image," Computer Vision and Pattern Recognition, 2008. CVPR 2008. IEEE Conference on, Jun. 23-28, 2008, pp. 1-pp. 8.

Raanan Fattal, et al., "Single Image Dehazing," ACM Transactions on Graphics (TOG)—Proceedings of ACM SIGGRAPH 2008 TOG Homepage, vol. 27, Issue 3, Aug. 2008, Article No. 72.

Kaiming He, et al., "Single Image Haze Removal Using Dark Channel Prior," IEEE Transactions on Pattern Analysis and Machine Intelligence, vol. 33, No. 12, Dec. 2011, pp. 2341-pp. 2353.

John Y. Chiang, et al., "Underwater Image Enhancement by Wavelength Compensation and Dehazing," IEEE Transactions on Image Processing, vol. 21, No. 4, Apr. 2012, pp. 1756-pp. 1769.

Yeu-Horng Shiau, et al., "Hardware Implementation of a Fast and Efficient Haze Removal Method," IEEE Transactions on Circuits and Systems for Video Technology, vol. 23, No. 8, Aug. 2013, pp. 1369-pp. 1374.

Wei-Jheng Wang, et al., "A Novel Visibility Restoration Algorithm for Single Hazy Images," SMC '13 Proceedings of the 2013 IEEE International Conference on Systems, Man, and Cybernetics, Oct. 2013, pp. 847-pp. 851.

* cited by examiner

METHOD AND IMAGE PROCESSING APPARATUS FOR IMAGE VISIBILITY RESTORATION

TECHNICAL FIELD

The present invention generally relates to a method and a system for image visibility restoration.

BACKGROUND

The visibility of outdoor images is often degraded by turbid medium in poor weather such as haze, fog, sandstorms, and so on. Optically, poor visibility in digital images is due to the substantial presence of different atmospheric particles which absorb and scatter light between a digital camera and a captured object. Image degradation may cause problems for many systems which must operate under a wide range of weather conditions such as outdoor object recognition systems, obstacle detection systems, video surveillance systems, and intelligent transportation systems.

In order to improve visibility in hazy images, haze removal techniques have been recently proposed. These may be divided into three major categories: an additional information approach, a multiple-image restoration approach, and a single-image restoration approach.

The additional information approach employs scene information to remove haze and recover vivid colors. Nevertheless, the scene depth information must be provided through user interaction, yet it is scarcely given for an arbitrary image. Thus, such approach does not hold for realistic application in arbitrary images.

The multiple-image restoration approach employs two or more images to estimate scene depth and subsequently remove haze formation. However, such approach mainly requires either a complex computation or a use of additional hardware devices. This may lead to costly restoration expenses. Hence, recent research has been focusing on the single-image restoration approach which is based on strong assumptions or priors.

A prior art method proposes a single-image restoration technique that removes haze by maximizing the local contrast of recovered scene radiance based on an observation that captured hazy images have lower contrast than restored images. However, such technique may result in unwanted feature artifact effects along depth edges. Another prior art method proposes another single-image restoration technique that estimates the albedo of the scene and deduces the transmission map based on an assumption that the transmission shading and the surface shading are locally uncorrelated. However, such technique may not contend with images featuring dense fog.

Yet another prior art proposes a dark channel prior method which uses a key assumption that most local patches for outdoor haze-free images exhibit very low intensity in at least one of color channel, which can be used to directly estimate haze density and recover vivid colors. Until now, such approach has attracted the most attention due to its ability to effectively remove haze formation. Nevertheless, the efficacy of haze removal may change in response to varied weather conditions and scene objects in realistic environments. In particular, such approach may not adequately deal with color distortions and complex structures. In these situations, color shift and artifact effects may occur in restored images.

SUMMARY OF THE INVENTION

Accordingly, the disclosure is directed to a method and an image processing apparatus for image visibility restoration, and the disclosure is able to effectively remove haze from a single image captured in real-world conditions.

The present invention is directed to a method for image visibility restoration, adapted to an image processing apparatus, includes the following steps: receiving an input hazy image comprising a plurality of input pixels; obtaining edge information of each of the input pixels according to a median filtering operation and a dark channel; determining a transmission map according to each of the input pixels and atmospheric light associated with the input hazy image in each color channel; obtaining a refined transmission map according to the edge information of each of the input pixels and the transmission map; adjusting the refined transmission map by performing a gamma correction operation thereon so as to obtain an enhanced transmission map; determining a color difference value corresponding to each of the color channels; recovering scene radiance for each of the input pixels in each of the color channels according to the corresponding color difference value, the corresponding atmospheric light, and the enhanced transmission map so as to produce a de-hazed image; and outputting the de-hazed image.

According to an embodiment of the disclosure, the step of obtaining the edge information of each of the input pixels according to the median filtering operation and the dark channel includes: performing the median filtering operation on a local patch associated with each of the input pixels so as to obtain a refined component; and obtaining the edge information of each of the input pixels by subtracting the corresponding dark channel from the corresponding refined component.

According to an embodiment of the disclosure, the formula for obtaining the edge information of each of the input pixels according to the median filtering operation and the dark channel prior includes Eq.(1):

$$D(x) = \omega \left( \min\left( \underset{y \in \Omega(x)}{\text{median}}(W(y)), W(x) \right) \right) - \min_{y \in \Omega(x)} (W(y)) \quad \text{Eq.(1)}$$

where $\Omega(x)$ is the local patch centered at x, W is a minimum value of each of the color channels in the input hazy image, $W(x)$ is the input pixel at x, $W(y)$ is each of the input pixels in the local patch $\Omega(x)$, $\omega$ is a constant parameter ranging between 0 and 1, $\omega(\min(\underset{y \in \Omega(x)}{\text{median}}(W(y)), W(x)))$ represents the refined component corresponding to the input pixel at x, $\min_{y \in \Omega(x)}(W(y))$ represents the dark channel corresponding to the input pixel at x, and $D(x)$ represents the edge information of the input pixel at x.

According to an embodiment of the disclosure, the formula for determining the transmission map according to each of the input pixels and the atmospheric light associated with the input hazy image in each color channel includes Eq.(2):

$$\tilde{t}(x) = 1 - \omega \min_{y \in \Omega(x)} \left( \min_{c \in (r,g,b)} \frac{I^c(y)}{A^c} \right) \quad \text{Eq.(2)}$$

where $c \in \{r,g,b\}$, $A^c$ represents the atmospheric light in the color channel c, $I^c$ represents the input haze image in the color channel c, and $\tilde{t}$ represents the transmission map.

According to an embodiment of the disclosure, the formula for obtaining the refined transmission map according to the edge information of each of the input pixels and the transmission map includes Eq.(3):

$$t_r(x) = \tilde{t}(x) - D(x) \quad \text{Eq.(3)}$$

where $\tilde{t}$ represents the transmission map, D(x) represents the edge information corresponding to the input pixel at x, and $t_r$ represents the refined transmission map.

According to an embodiment of the disclosure, the step of adjusting the refined transmission map by performing the gamma correction operation thereon so as to obtain the enhanced transmission map includes: redistributing the refined transmission map according to a varying adaptive parameter and a maximum intensity of the input hazy image.

According to an embodiment of the disclosure, the formulas for adjusting the refined transmission map by performing the gamma correction operation thereon so as to obtain the enhanced transmission map include Eq.(4) and Eq.(5):

$$t_e(x) = (X_{max})\left(\frac{t_r(x)}{X_{max}}\right)^\gamma \qquad \text{Eq.(4)}$$

$$\gamma = \begin{cases} 1 + \left(\frac{t}{X_{max}}\right) & \text{if } t \geq T \\ 1 & \text{if } t < T \end{cases} \qquad \text{Eq.(5)}$$

where $\gamma$ is the varying adaptive parameter, $X_{max}$ is the maximum intensity of the input hazy image, $t_r$ is the refined transmission map, $t_e$ is the enhanced transmission map, t is an intensity value corresponding to a cumulative probability density of the input pixels with a non-zero first threshold value, and T is an adaptive intensity threshold value.

According to an embodiment of the disclosure, the formulas for determining the color difference value corresponding to each of the color channels include Eq.(6) and Eq.(7):

$$d^c = avg_r - avg_c \qquad \text{Eq.(6)}$$

$$avg_c = \frac{\sum_{i=1}^{M}\sum_{j=1}^{N} I^c(i,j)}{MN} \qquad \text{Eq.(7)}$$

where $c \in \{r,g,b\}$, $d^c$ is the color difference value corresponding to the color channel c, $avg_c$ is an average intensity of the color channel c, $I^c$ represents the input hazy image, and MN represents the total number of the input pixels.

According to an embodiment of the disclosure, the formulas for recovering the scene radiance for each of the input pixels in each of the color channels according to the corresponding color difference value, the corresponding atmospheric light, and the enhanced transmission map so as to produce the de-hazed image includes Eq.(8):

$$J^c(x) = \frac{I^c(x) - (A^c - d^c)}{\max(t_e(x), t_0)} + (A^c - d^c) \qquad \text{Eq.(8)}$$

where $c \in \{r,g,b\}$, $J^c(x)$ represents the scene radiance in the de-hazed image at x in the color channel c, $A^c$ represents the atmospheric light in the color channel c, $d^c$ is the color difference value corresponding to the color channel c, $t_0$ is a lower transmission bound, and $t_e$ is the enhanced transmission map.

The disclosure is directed to an image processing apparatus including a storage unit and a processing unit, where the processing unit is coupled to the storage unit. The storage unit is configured to record a plurality of modules. The processing unit is configured to access and execute the modules recorded in the storage unit, where the modules include an image receiving module, a depth estimation module, a color analysis module, a visibility restoration module, an image output module. The image receiving module receives an input hazy image including a plurality of input pixels. The depth estimation module obtains edge information of each of the input pixels according to a median filtering operation and a dark channel, determines a transmission map according to each of the input pixels and atmospheric light associated with the input hazy image in each color channel, obtains a refined transmission map according to the edge information of each of the input pixels and the transmission map, and adjusts the refined transmission map by performing a gamma correction operation thereon so as to obtain an enhanced transmission map. The color analysis module determines a color difference value corresponding to each of the color channels. The visibility restoration module recovers scene radiance for each of the input pixels in each of the color channels according to the corresponding color difference value, the corresponding atmospheric light, and the enhanced transmission map so as to produce a de-hazed image. The image output module outputs the de-hazed image.

According to an embodiment of the disclosure, the depth estimation module performs the median filtering operation on a local patch associated with each of the input pixels so as to obtain a refined component and obtains the edge information of each of the input pixels by subtracting the corresponding dark channel from the corresponding refined component.

According to an embodiment of the disclosure, the depth estimation module obtains the edge information of each of the input pixels according to the median filtering operation and the dark channel prior based on Eq.(1):

$$D(x) = \omega\left(\min\left(\underset{y\in\Omega(x)}{\text{median}}(W(y)), W(x)\right)\right) - \min_{y\in\Omega(x)}(W(y)) \qquad \text{Eq.(1)}$$

where $\Omega(x)$ is the local patch centered at x, W is a minimum value of each of the color channels in the input hazy image, W(x) is the input pixel at x, W(y) is each of the input pixels in the local patch $\Omega(x)$, $\omega$ is a constant parameter ranging between 0 and 1, $$\omega\left(\min\left(\underset{y\in\Omega(x)}{\text{median}}(W(y)), W(x)\right)\right)$$

represents the refined component corresponding to the input pixel at x, $\min_{y\in\Omega(x)}(W(y))$ represents the dark channel corresponding to the input pixel at x, and D(x) represents the edge information of the input pixel at x.

According to an embodiment of the disclosure, the depth estimation module determines the transmission map according to each of the input pixels and the atmospheric light associated with the input hazy image in each color channel based on Eq.(2):

$$\tilde{t}(x) = 1 - \omega \min_{y\in\Omega(x)}\left(\min_{c\in\{r,g,b\}} \frac{I^c(y)}{A^c}\right) \qquad \text{Eq.(2)}$$

where c ∈ {r,g,b}, $A^c$ represents the atmospheric light in the color channel c, $I^c$ represents the input haze image in the color channel c, $\tilde{t}$ represents the transmission map.

According to an embodiment of the disclosure, the depth estimation module obtains the refined transmission map according to the edge information of each of the input pixels and the transmission map based on Eq.(3):

$$t_r(x) = \tilde{t}(x) - D(x) \qquad \text{Eq.(3)}$$

where $\tilde{t}$ represents the transmission map, $D(x)$ represents the edge information corresponding to the input pixel at x, and $t_r$ represents the refined transmission map.

According to an embodiment of the disclosure, the depth estimation module redistributes the refined transmission map according to a varying adaptive parameter and a maximum intensity of the input hazy image.

According to an embodiment of the disclosure, the depth estimation module adjusts the refined transmission map by performing the gamma correction operation thereon so as to obtain the enhanced transmission map based on Eq.(4) and Eq.(5):

$$t_e(x) = (X_{max})\left(\frac{t_r(x)}{X_{max}}\right)^\gamma \qquad \text{Eq.(4)}$$

$$\gamma = \begin{cases} 1 + \left(\frac{t}{X_{max}}\right) & \text{if } t \geq T \\ 1 & \text{if } t < T \end{cases} \qquad \text{Eq.(5)}$$

where $\gamma$ is the varying adaptive parameter, $X_{max}$ is the maximum intensity of the input hazy image, $t_r$ is the refined transmission map, $t_e$ is the enhanced transmission map, t is an intensity value corresponding to a cumulative probability density of the input pixels with a non-zero first threshold value, and T is an adaptive intensity threshold value.

According to an embodiment of the disclosure, the color analysis module determines the color difference value corresponding to each of the color channels comprise Eq.(6) and Eq.(7):

$$d^c = \text{avg}_r - \text{avg}_c \qquad \text{Eq.(6)}$$

$$\text{avg}_c = \frac{\sum_{i=1}^{M}\sum_{j=1}^{N} I^c(i,j)}{MN} \qquad \text{Eq.(7)}$$

where c ∈ {r,g,b}, $d^c$ is the color difference value corresponding to the color channel c, $\text{avg}_c$ is an average intensity of the color channel c, $I^c$ represents the input hazy image, and MN represents the total number of the input pixels.

According to an embodiment of the disclosure, the visibility restoration module recovers the scene radiance for each of the input pixels in each of the color channels according to the corresponding color difference value, the corresponding atmospheric light, and the enhanced transmission map so as to produce the de-hazed image comprises Eq.(8):

$$J^c(x) = \frac{I^c(x) - (A^c - d^c)}{\max(t_e(x), t_0)} + (A^c - d^c) \qquad \text{Eq.(8)}$$

where c ∈ {r,g,b}, $J^c(x)$ represents the scene radiance in the de-hazed image at x in the color channel c, $A^c$ represents the atmospheric light in the color channel c, $d^c$ is the color difference value corresponding to the color channel c, $t_0$ is a lower transmission bound, and $t_e$ is the enhanced transmission map.

In order to make the aforementioned features and advantages of the disclosure comprehensible, preferred embodiments accompanied with figures are described in detail below. It is to be understood that both the foregoing general description and the following detailed description are exemplary, and are intended to provide further explanation of the disclosure as claimed. It also should be understood, that the summary may not contain all of the aspect and embodiments of the present disclosure and is therefore not meant to be limiting or restrictive in any manner. Also the disclosure would include improvements and modifications which are obvious to one skilled in the art.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
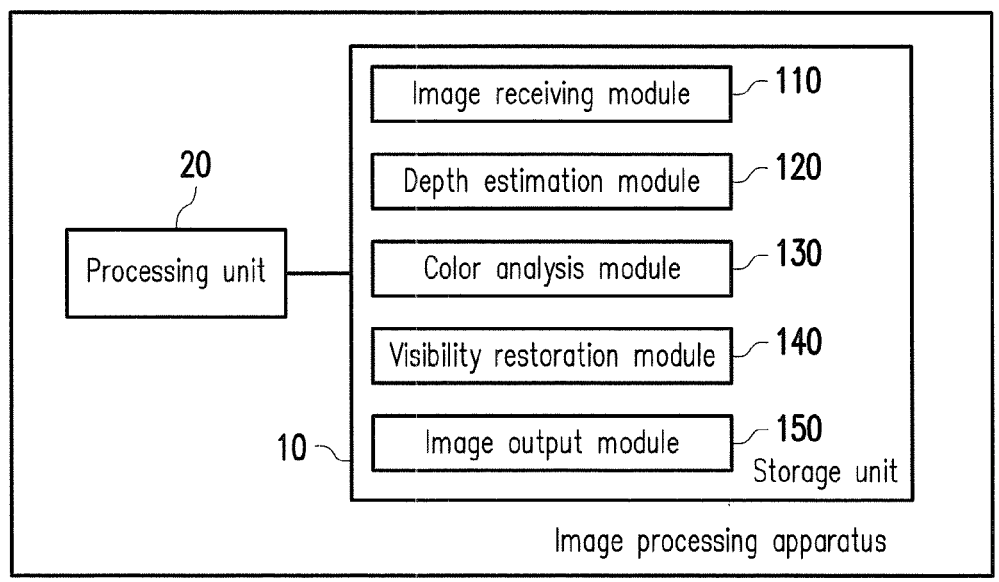
FIG. 1 illustrates an exemplary image processing apparatus which utilizes the proposed image visibility restoration method from the hardware perspective in accordance with one of the exemplary embodiments of the disclosure.

Reference will now be made in detail to the present embodiments of the invention, examples of which are illustrated in the accompanying drawings. Wherever possible, the same reference numbers are used in the drawings and the description to refer to the same or like parts. In addition, the specifications and the like shown in the drawing figures are intended to be illustrative, and not restrictive. Therefore, specific structural and functional detail disclosed herein are not to be interpreted as limiting, but merely as a representative basis for teaching one skilled in the art to variously employ the present invention.

FIG. 1 illustrates an exemplary image processing apparatus which utilizes the proposed image visibility restoration method from the hardware perspective in accordance with one of the exemplary embodiments of the disclosure. Referring to FIG. 1, an image processing apparatus 100 may include a storage unit 10 and a processing unit 20, where the processing unit 20 is coupled to the storage unit 10.

The image processing apparatus 100 may be an electronic device such as a personal computer, a laptop computer, a digital camera, a digital camcorder, a web camera, a smart phone, a tabular computer, an event data recorder, a vehicle audio and video system, and so forth.

The storage unit 10 may be one or a combination of a stationary or mobile random access memory (RAM), a read-only memory (ROM), a flash memory, a hard drive or other similar devices. The storage unit 10 is configured to record a plurality of modules executable by the processing unit 20. The modules include an image receiving module 110, a depth estimation module 120, a color analysis module 130, a visibility restoration module 140, and an image output module 150. The modules may be loaded into the processing unit 20 for visibility restoration from a digital image.

The processing unit 20 may be, for example, a central processing unit (CPU) or other programmable devices for general purpose or special purpose such as a microprocessor and a digital signal processor (DSP), a programmable controller, an application specific integrated circuit (ASIC), a programmable logic device (PLD) or other similar devices or a combination of aforementioned devices. The processing unit 20 is capable of accessing and executing the modules recorded in the storage unit 10 and would be used to perform the visibility restoration method as proposed.

Figure 2:
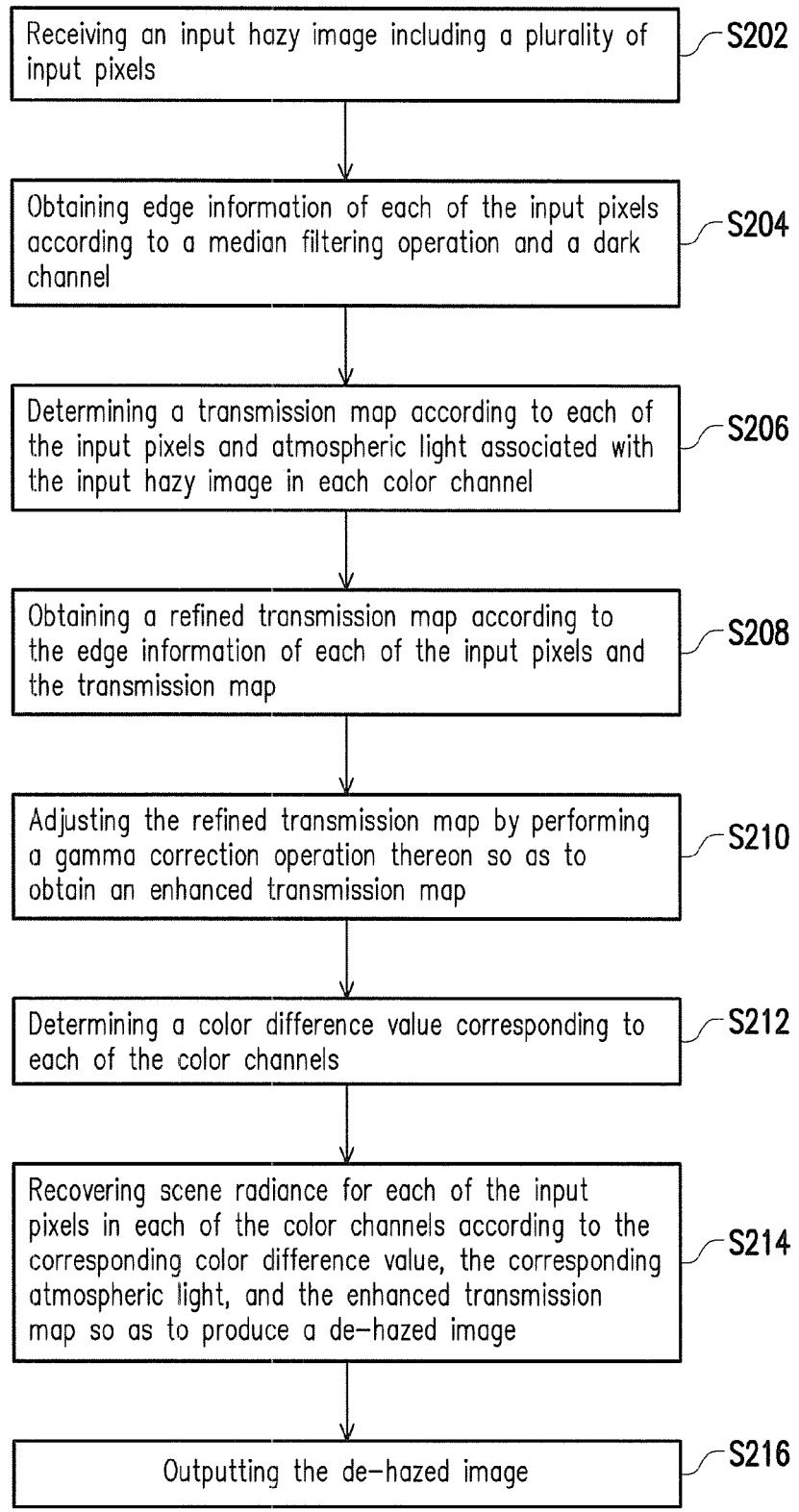
FIG. 2 illustrates a flowchart of an image visibility restoration method in accordance with one of the exemplary embodiments of the disclosure.

FIG. 2 illustrates a flowchart of an image visibility restoration method in accordance with one of the exemplary embodiments of the disclosure. The method proposed in the present embodiment may be performed by the image processing apparatus 100 of FIG. 1.

Referring to both FIG. 1 and FIG. 2, the image receiving module 110 first receives an input hazy image including a plurality of input pixels (Step S202). In the present embodiment, the proposed method is built in an RGB color space via three color channels, where the three color channels are red (R), green (G), and blue (B).

In order to restore image visibility degraded by haze, the conventional dark channel prior method may only work decently under certain weather conditions. Two prominent problems exist in regard to the dark channel prior technique: generation of halo effects and insufficient transmission map estimation. Because the primary operation of the dark channel prior depends on a minimum filter, a transmission map may usually experience a loss of edge information when estimation occurs. Hence, a refined transmission procedure is proposed herein, where a median filter technique is employed to preserve edge information of input hazy image and thereby avoid generation of halo effects.

First, the depth estimation module 120 obtains edge information of each of the input pixels according to a median filtering operation and a dark channel (Step S204). The median filter technique may employ a nonlinear filtering operation which is able to effectively suppress impulsive noise components while preserve edge information. The depth estimation module 120 may first perform the median filtering operation on a local patch associated with each of the input pixels to obtain a refined component, and may then obtain the edge information of each of the input pixels by subtracting the corresponding dark channel from the corresponding refined component.

In an embodiment, the depth estimation module 120 may determine the edge information of each of the input pixels according to Eq.(1):

$$D(x) = \omega\left(\min\left(\underset{y\in\Omega(x)}{\text{median}}(W(y)), W(x)\right)\right) - \min_{y\in\Omega(x)}(W(y)) \quad \text{Eq.(1)}$$

where $\Omega(x)$ is the local patch centered at x, W is a minimum value of each of the color channels in the input hazy image, W(x) is the input pixel at x, W(y) is each of the input pixels in the local patch $\Omega(x)$, $\omega$ is a constant parameter ranging between 0 and 1 and may be set to 0.95, $$\omega\left(\min\left(\underset{y\in\Omega(x)}{\text{median}}(W(y)), W(x)\right)\right)$$

represents the refined component corresponding to the input pixel at x, $\min_{y\in\Omega(x)}(W(y))$ represents the dark channel corresponding to the input pixel at x, and D(x) represents the edge information of the input pixel at x.

Next, the depth estimation module 120 determines a transmission map according to each of the input pixels and atmospheric light associated with the input hazy image in each color channel (Step S206), and then obtains a refined transmission map according to the edge information of each of the input pixels and the transmission map (Step S208). To be specific, the depth estimation module 120 may estimate the transmission map based on the conventional dark channel prior method as expressed in Eq.(2):

$$\tilde{t}(x) = 1 - \omega \min_{y\in\Omega(x)}\left(\min_{c\in(r,g,b)} \frac{I^c(y)}{A^c}\right) \quad \text{Eq.(2)}$$

where $c \in \{r,g,b\}$, $A^c$ represents the atmospheric light in the color channel c, $I^c$ represents the input haze image in the color channel c, $\tilde{t}$ represents the transmission map. Next, the depth estimation module 120 may obtain the refined transmission map according to Eq.(3):

$$t_r(x) = \tilde{t}(x) - D(x) \quad \text{Eq.(3)}$$

where $\tilde{t}$ represents the transmission map, D(x) represents the edge information corresponding to the input pixel at x, and $t_r$ represents the refined transmission map.

The dark channel prior depends on a minimum value of each of the color channels and may produce an insufficient transmission map for images captured in inclement weather conditions such as sandstorms. This is because the intensity value would be lower for at least one of the color channels in the captured images. In order to achieve optimum image visibility restoration results, an enhanced transmission procedure is proposed, where an adaptive gamma correction technique is employed to redistribute the refined transmission map within a dynamic range of the corresponding histogram. Hence, the depth estimation module 120 adjusts the refined transmission map by performing a gamma correction operation thereon so as to obtain an enhanced transmission map (Step S210).

To be specific, the depth estimation module 120 may redistribute the refined transmission map according to a varying adaptive parameter and a maximum intensity of the input hazy image based on Eq.(4) and Eq.(5):

$$t_e(x) = (X_{max})\left(\frac{t_r(x)}{X_{max}}\right)^\gamma \quad \text{Eq.(4)}$$

$$\gamma = \begin{cases} 1 + \left(\frac{t}{X_{max}}\right) & \text{if } t \geq T \\ 1 & \text{if } t < T \end{cases} \quad \text{Eq.(5)}$$

where γ is the varying adaptive parameter, $X_{max}$ is the maximum intensity of the input hazy image, $t_r$ is the refined transmission map, $t_e$ is the enhanced transmission map, t is an intensity value corresponding to a cumulative probability density of the input pixels with a non-zero first threshold value, and T is an adaptive intensity threshold value. In the present embodiment, the first threshold value may be 0.1, and the adaptive threshold value T may be empirically set to 120. From observations, slight sandstorm conditions may possess a lower adaptive parameter, whereas heavy sandstorm conditions may possess a higher adaptive parameter. Using such characteristic, the proposed enhanced transmission procedure involving the adaptive gamma correction technique may progressively increase the low intensity frequency of the transmission and avoid artifacts produced by equalization of the gamma correction.

The particles of sand in the atmosphere caused by sandstorms absorb specific portions of the color spectrum. This phenomenon may lead to color shifts in images captured during such conditions and may result in different color channel distributions. The conventional dark channel prior technique uses the same formula for each of the color channels when recovering scene radiance, thereby causing serious color shifts in restored images. To solve such problem, the color analysis module 130 determines a color difference value corresponding to each of the color channels (Step S212). In an embodiment, the color analysis module 130 may obtain the color difference value according to Eq.(6) and Eq.(7):

$$d^c = \text{avg}_r - \text{avg}_c \qquad \text{Eq.(6)}$$

$$\text{avg}_c = \frac{\sum_{i=1}^{M}\sum_{j=1}^{N} I^c(i,j)}{MN} \qquad \text{Eq.(7)}$$

where $c \in \{r,g,b\}$, $d^c$ is the color difference value corresponding to the color channel c, $\text{avg}_c$ is an average intensity of the color channel c, $I^c$ represents the input hazy image, and MN represents the total number of the input pixels.

Furthermore, in order to produce a high-equality haze-free image captured in different environments, the visibility restoration module 140 may combine the information provided via the depth estimation module 120 and the color analysis module 130 to effectively recover the scene radiance. In other words, the visibility restoration module 140 recovers scene radiance for each of the input pixels in each of the color channels according to the corresponding color difference value, the corresponding atmospheric light, and the enhanced transmission map so as to produce a de-hazed image (Step S214). The visibility restoration module 140 may employ Eq.(8) to effectively recover the input hazy image marred by atmospheric particles:

$$J^c(x) = \frac{I^c(x) - (A^c - d^c)}{\max(t_e(x), t_0)} + (A^c - d^c) \qquad \text{Eq.(8)}$$

where $c \in \{r,g,b\}$, $J^c(x)$ represents the scene radiance in the de-hazed image at x in the color channel c, $A^c$ represents the atmospheric light in the color channel c, $d^c$ is the color difference value corresponding to the color channel c, $t_0$ is a lower transmission bound, and $t_e$ is the enhanced transmission map. In an embodiment, $t_0$ may be set to 0.1.

After the visibility restoration module 140 produces the de-hazed image, the output module 150 outputs the de-hazed image (Step S216), and the image processing apparatus 100 completes the image visibility restoration method.

Figure 3:
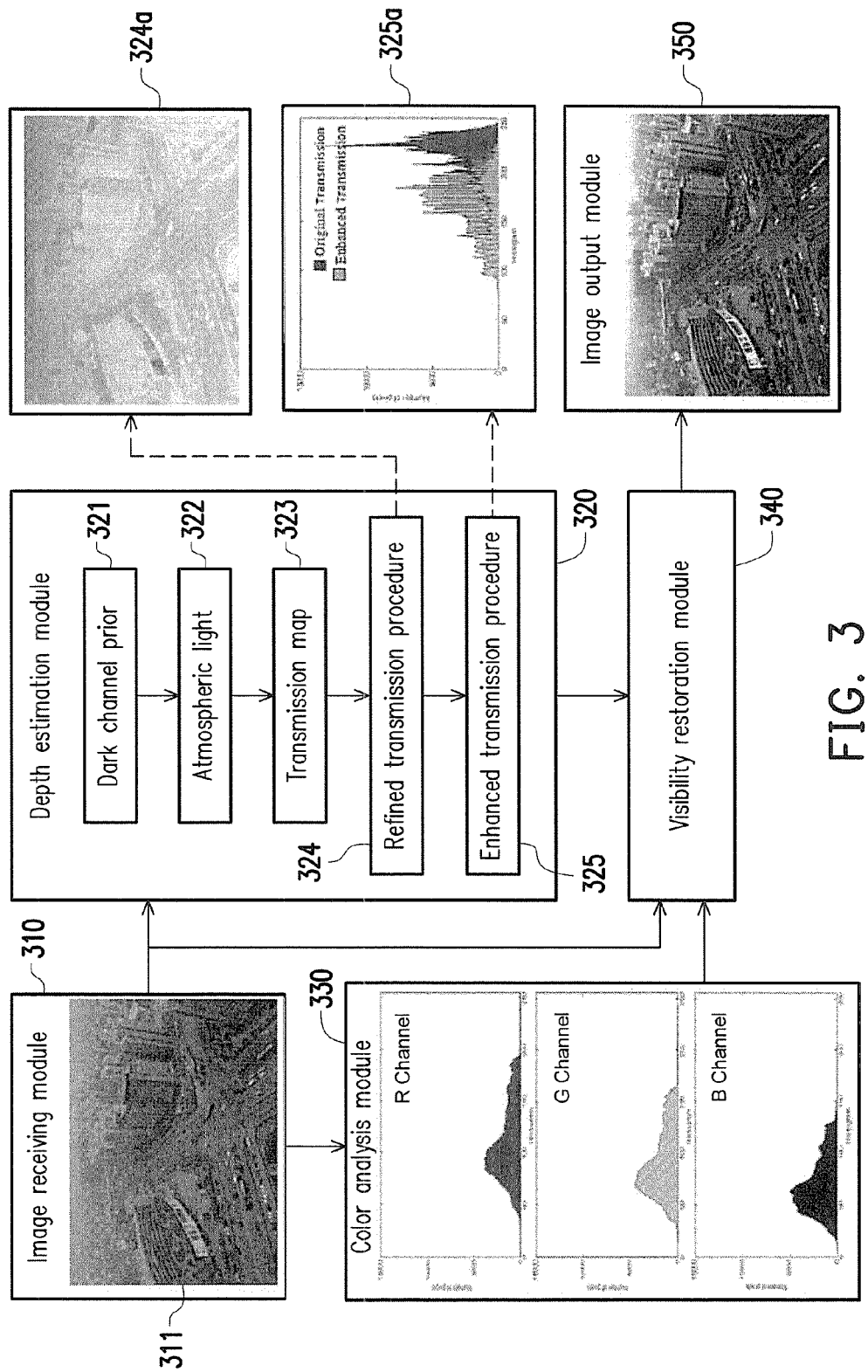
FIG. 3 illustrates an image visibility restoration method in terms of functional block diagrams in accordance with one of the exemplary embodiments of the disclosure.

The proposed image visibility restoration method may be summarized by FIG. 3 in terms of functional block diagrams in accordance with one of the exemplary embodiments of the disclosure. Referring to FIG. 3, a depth estimation module 320 receives an input hazy image 311 from an image receiving module 310. The depth estimation module 320 estimates a transmission map 323 based on a dark channel prior 321 and atmospheric light 328 associated with the input hazy image 311. The depth estimation module 320 next performs an effective refined transmission procedure 324 which takes advantage of a median filter to preserve edge information and thereby avoid generation of block artifacts in the restored image. A refined transmission map 324a is produced after the refined transmission procedure 324 is completed. The refined transmission procedure 324 is followed by a transmission enhancement procedure 325 which adjusts the intensity of the refined transmission map 324a to achieve an optimum visibility restoration result based on an adaptive gamma correction technique. An enhanced transmission map 325a is produced after the transmission enhancement procedure 325 is completed. On the other hand, a color analysis module 330 uses the gray world assumption to effectively obtain the color information of the input hazy image 311. The obtained color information may be adapted for various weather conditions including haze, fog, and sandstorms. A visibility restoration module 340 combines the information obtained by the depth estimation module 320 and the color analysis module 330 to adequately conceal the atmospheric particles present in various real-world weather conditions. An image output module 350 outputs the de-hazed image 351 and completes the visibility restoration method.

In view of the aforementioned descriptions, through a conjunctive utilization of a median filter operation, an adaptive gamma correction technique, and a dark channel prior method, the disclosure is able to avoid generation of halo effects and insufficient estimation of a transmission map of an input hazy image. Color characteristics of the input hazy image are further analyzed to circumvent color distortion problems. Accordingly, a high-quality haze-free image may be obtained based on the adjusted transmission map and color-correlated information under realistic scenes under varied weather conditions and features.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for image visibility restoration, adapted to an image processing apparatus, comprising:
   receiving an input hazy image comprising a plurality of input pixels;
   obtaining edge information of each of the input pixels according to a median filtering operation and a dark channel;
   determining a transmission map according to each of the input pixels and atmospheric light associated with the input hazy image in each color channel;
   obtaining a refined transmission map according to the edge information of each of the input pixels and the transmission map;
   adjusting the refined transmission map by performing a gamma correction operation thereon so as to obtain an enhanced transmission map;
   determining a color difference value corresponding to each of the color channels;
   recovering scene radiance for each of the input pixels in each of the color channels according to the corresponding color difference value, the corresponding atmospheric light, and the enhanced transmission map so as to produce a de-hazed image; and
   outputting the de-hazed image.

2. The method according to claim 1, wherein the step of obtaining the edge information of each of the input pixels according to the median filtering operation and the dark channel comprises:
   performing the median filtering operation on a local patch associated with each of the input pixels so as to obtain a refined component; and
   obtaining the edge information of each of the input pixels by subtracting the corresponding dark channel from the corresponding refined component.

3. The method according to claim 2, wherein the formula for obtaining the edge information of each of the input pixels according to the median filtering operation and the dark channel prior comprises Eq.(1):

$$D(x) = \omega\left(\min\left(\underset{y \in \Omega(x)}{\text{median}}(W(y)), W(x)\right)\right) - \min_{y \in \Omega(x)}(W(y)) \qquad \text{Eq.(1)}$$

wherein $\Omega(x)$ is the local patch centered at x, W is a minimum value of each of the color channels in the input hazy image, W(x) is the input pixel at x, W(y) is each of the input pixels in the local patch $\Omega(x)$, $\omega$ is a constant parameter ranging between 0 and 1, $$\omega\left(\min\left(\underset{y \in \Omega(x)}{\text{median}}(W(y)), W(x)\right)\right)$$

represents the refined component corresponding to the input pixel at x, $\min_{y \in \Omega(x)}(W(y))$ represents the dark channel corresponding to the input pixel at x, and D(x) represents the edge information of the input pixel at x.

4. The method according to claim 3, wherein the formula for determining the transmission map according to each of the input pixels and the atmospheric light associated with the input hazy image in each color channel comprises Eq.(2):

$$\tilde{t}(x) = 1 - \omega \min_{y \in \Omega(x)}\left(\min_{c \in (r,g,b)} \frac{I^c(y)}{A^c}\right) \qquad \text{Eq.(2)}$$

$c \in \{r,g,b\}$, $A^c$ represents the atmospheric light in the color channel c, $I^c$ represents the input haze image in the color channel c, and $\tilde{t}$ represents the transmission map.

5. The method according to claim 4, wherein the formula for obtaining the refined transmission map according to the edge information of each of the input pixels and the transmission map comprises Eq.(3):

$$t_r(x) = \tilde{t}(x) - D(x) \qquad \text{Eq.(3)}$$

wherein $\tilde{t}$ represents the transmission map, D(x) represents the edge information corresponding to the input pixel at x, and $t_r$ represents the refined transmission map.

6. The method according to claim 1, wherein the step of adjusting the refined transmission map by performing the gamma correction operation thereon so as to obtain the enhanced transmission map comprises:
   redistributing the refined transmission map according to a varying adaptive parameter and a maximum intensity of the input hazy image.

7. The method according to claim 6, wherein the formulas for adjusting the refined transmission map by performing the gamma correction operation thereon so as to obtain the enhanced transmission map comprise Eq.(4) and Eq.(5):

$$t_e(x) = (X_{max})\left(\frac{t_r(x)}{X_{max}}\right)^\gamma \qquad \text{Eq.(4)}$$

$$\gamma = \begin{cases} 1 + \left(\frac{t}{X_{max}}\right) & \text{if } t \geq T \\ 1 & \text{if } t < T \end{cases} \qquad \text{Eq.(5)}$$

wherein $\gamma$ is the varying adaptive parameter, $X_{max}$ is the maximum intensity of the input hazy image, $t_r$ is the refined transmission map, $t_e$ is the enhanced transmission map, t is an intensity value corresponding to a cumulative probability density of the input pixels with a non-zero first threshold value, and T is an adaptive intensity threshold value.

8. The method according to claim 1, wherein the formulas for determining the color difference value corresponding to each of the color channels comprise Eq.(6) and Eq.(7):

$$d^c = \text{avg}_r - \text{avg}_c \qquad \text{Eq.(6)}$$

$$\text{avg}_c = \frac{\sum_{i=1}^{M}\sum_{j=1}^{N} I^c(i,j)}{MN} \qquad \text{Eq.(7)}$$

wherein $c \in \{r,g,b\}$, $d^c$ is the color difference value corresponding to the color channel c, $\text{avg}_c$ is an average intensity of the color channel c, $I^c$ represents the input hazy image, and MN represents the total number of the input pixels.

9. The method according to claim 1, wherein the formulas for recovering the scene radiance for each of the input pixels in each of the color channels according to the corresponding color difference value, the corresponding atmospheric light, and the enhanced transmission map so as to produce the de-hazed image comprises Eq.(8):

$$J^c(x) = \frac{I^c(x) - (A^c - d^c)}{\max(t_e(x), t_0)} + (A^c - d^c) \qquad \text{Eq.(8)}$$

wherein $c \in \{r,g,b\}$, $J^c(x)$ represents the scene radiance in the de-hazed image at x in the color channel c, $A^c$ represents the atmospheric light in the color channel c, $d^c$ is the color difference value corresponding to the color channel c, $t_0$ is a lower transmission bound, and $t_e$ is the enhanced transmission map.

10. An image processing apparatus, comprising:
   a storage unit, recording a plurality of modules; and
   a processing unit, coupled to the storage unit, accessing and executing the modules recorded in the storage unit, wherein the modules comprise:
      an image receiving module, receiving an input hazy image comprising a plurality of input pixels;
      a depth estimation module, obtaining edge information of each of the input pixels according to a median filtering operation and a dark channel, determining a transmission map according to each of the input pixels and atmospheric light associated with the input hazy image in each color channel, obtaining a refined transmission map according to the edge information of each of the input pixels and the transmission map, and adjusting the refined transmission map by performing a gamma correction operation thereon so as to obtain an enhanced transmission map;
      a color analysis module, determining a color difference value corresponding to each of the color channels;
      a visibility restoration module, recovering scene radiance for each of the input pixels in each of the color channels according to the corresponding color difference value, the corresponding atmospheric light, and the enhanced transmission map so as to produce a de-hazed image; and
      an image output module, outputting the de-hazed image.

11. The image processing apparatus according to claim 10, wherein the depth estimation module performs the median filtering operation on a local patch associated with each of the input pixels so as to obtain a refined component and obtains the edge information of each of the input pixels by subtracting the corresponding dark channel from the corresponding refined component.

12. The image processing apparatus according to claim 11, wherein the depth estimation module obtains the edge information of each of the input pixels according to the median filtering operation and the dark channel prior based on Eq.(1):

$$D(x) = \omega\left(\min\left(\underset{y \in \Omega(x)}{\text{median}}(W(y)), W(x)\right)\right) - \min_{y \in \Omega(x)}(W(y)) \qquad \text{Eq.(1)}$$

wherein $\Omega(x)$ is the local patch centered at x, W is a minimum value of each of the color channels in the input hazy image, W(x) is the input pixel at x, W(y) is each of the input pixels in the local patch $\Omega(x)$, $\omega$ is a constant parameter ranging between 0 and 1, $\omega(\min(\underset{y \in \Omega(x)}{\text{median}}(W(y)), W(x))$ represents the refined component corresponding to the input pixel at x, $\min_{y \in \Omega(x)}(W(y))$ represents the dark channel corresponding to the input pixel at x, and D(x) represents the edge information of the input pixel at x.

13. The image processing apparatus according to claim 12, wherein the depth estimation module determines the transmission map according to each of the input pixels and the atmospheric light associated with the input hazy image in each color channel based on Eq.(2):

$$\tilde{t}(x) = 1 - \omega \min_{y \in \Omega(x)}\left(\min_{c \in \{r,g,b\}} \frac{I^c(y)}{A^c}\right) \qquad \text{Eq.(2)}$$

wherein $c \in \{r,g,b\}$, $A^c$ represents the atmospheric light in the color channel c, $I^c$ represents the input haze image in the color channel c, and $\tilde{t}$ represents the transmission map.

14. The image processing apparatus according to claim 13, wherein the depth estimation module obtains the refined transmission map according to the edge information of each of the input pixels and the transmission map based on Eq.(3):

$$t_r(x) = \tilde{t}(x) - D(x) \qquad \text{Eq.(3)}$$

wherein $\tilde{t}$ represents the transmission map, D(x) represents the edge information corresponding to the input pixel at x, and $t_r$ represents the refined transmission map.

15. The image processing apparatus according to claim 10, wherein the depth estimation module redistributes the refined transmission map according to a varying adaptive parameter and a maximum intensity of the input hazy image.

16. The image processing apparatus according to claim 15, wherein the depth estimation module adjusts the refined transmission map by performing the gamma correction operation thereon so as to obtain the enhanced transmission map based on Eq.(4) and Eq.(5):

$$t_e(x) = (X_{max})\left(\frac{t_r(x)}{X_{max}}\right)^\gamma \qquad \text{Eq.(4)}$$

$$\gamma = \begin{cases} 1 + \left(\frac{t}{X_{max}}\right) & \text{if } t \geq T \\ 1 & \text{if } t < T \end{cases} \qquad \text{Eq.(5)}$$

wherein $\gamma$ is the varying adaptive parameter, $X_{max}$ is the maximum intensity of the input hazy image, $t_r$ is the refined transmission map, $t_e$ is the enhanced transmission map, t is an intensity value corresponding to a cumulative probability density of the input pixels with a non-zero first threshold value, and T is an adaptive intensity threshold value.

17. The image processing apparatus according to claim 10, wherein the color analysis module determines the color difference value corresponding to each of the color channels comprise Eq.(6) and Eq.(7):

$$d^c = \text{avg}_r - \text{avg}_c \qquad \text{Eq.(6)}$$

$$\text{avg}_c = \frac{\sum_{i=1}^{M}\sum_{j=1}^{N} I^c(i,j)}{MN} \qquad \text{Eq.(7)}$$

where $c \in \{r,g,b\}$, $d^c$ is the color difference value corresponding to the color channel c, $\text{avg}_c$ is an average intensity of the color channel c, $I^c$ represents the input hazy image, and MN represents the total number of the input pixels.

18. The image processing apparatus according to claim 10, wherein the visibility restoration module recovers the scene radiance for each of the input pixels in each of the color channels according to the corresponding color difference value, the corresponding atmospheric light, and the enhanced transmission map so as to produce the de-hazed image comprises Eq.(8):

$$J^c(x) = \frac{I^c(x) - (A^c - d^c)}{\max(t_e(x), t_0)} + (A^c - d^c) \qquad \text{Eq.(8)}$$

wherein $c \in \{r,g,b\}$, $J^c(x)$ represents the scene radiance in the de-hazed image at x in the color channel c, $A^c$ represents the atmospheric light in the color channel c, $d^c$ is the color difference value corresponding to the color channel c, $t_0$ is a lower transmission bound, and $t_e$ is the enhanced transmission map.

\* \* \* \* \*